(12) United States Patent
Gopalaswamy et al.

(10) Patent No.: US 6,219,192 B1
(45) Date of Patent: Apr. 17, 2001

(54) METHOD AND APPARATUS FOR THE COMPENSATION OF AN ADDITIVE SIGNAL IN A DATA SIGNAL

(75) Inventors: Srinivasan Gopalaswamy; Bin Liu; Yuan Xing Lee, all of Singapore (SG)

(73) Assignee: Data Storage Institute, Kent Ridge Crescent (SG)

( * ) Notice: Subject to any disclaimer, the term of this patent is extended or adjusted under 35 U.S.C. 154(b) by 0 days.

(21) Appl. No.: 09/179,148

(22) Filed: Oct. 26, 1998

(30) Foreign Application Priority Data

Apr. 9, 1998 (SG) .................................................. 9800822

(51) Int. Cl.⁷ ..................................................... G11B 5/02
(52) U.S. Cl. ............................... 360/25; 360/46; 360/67; 360/53
(58) Field of Search ............................... 360/25, 46, 51, 360/67, 65, 53; 375/262, 341, 345, 346

(56) References Cited

U.S. PATENT DOCUMENTS 5,583,706 * 12/1996 Dudley et al. ...................... 360/65 X
5,701,314 * 12/1997 Armstrong et al. .................. 714/765
5,862,007 * 1/1999 Pham et al. ............................. 360/65
6,005,726 * 12/1999 Tsunoda .................................. 360/46

* cited by examiner

*Primary Examiner*—Alan T. Faber
(74) *Attorney, Agent, or Firm*—John P. White; Cooper & Dunham LLP (57) ABSTRACT

The method and apparatus have application to the compensation of transient signals produced on reading a data storage device with a magneto-resistive head due to thermal contact with asperities on the data storage medium. Preferably, the data channel employs partial-response maximum-likelihood detection.

The method compensates for an additive signal in a data signal and comprises the steps of: detecting the contribution to said data signal by said additive signal; initially compensating the data signal by maintaining a DC offset in said data signal, the initial level of said DC offset being set in dependence on the detected contribution; and while compensating the data signal, detecting when the compensated data signal exceeds a predetermined threshold and varying the set level of said DC offset in dependence upon said detection.

49 Claims, 10 Drawing Sheets

METHOD AND APPARATUS FOR THE COMPENSATION OF AN ADDITIVE SIGNAL IN A DATA SIGNAL

The present invention relates generally to a method of compensating for an additive signal in a data signal and circuitry for compensating for an additive signal in a data signal. The invention is particularly useful in a data channel employing partial-response maximum-likelihood (PRML) detection.

The method and apparatus have particular application to the compensation of transient signals produced on reading a data storage device with a magneto-resistive head due to thermal contact with asperities on the data storage medium.

Figure 2A:
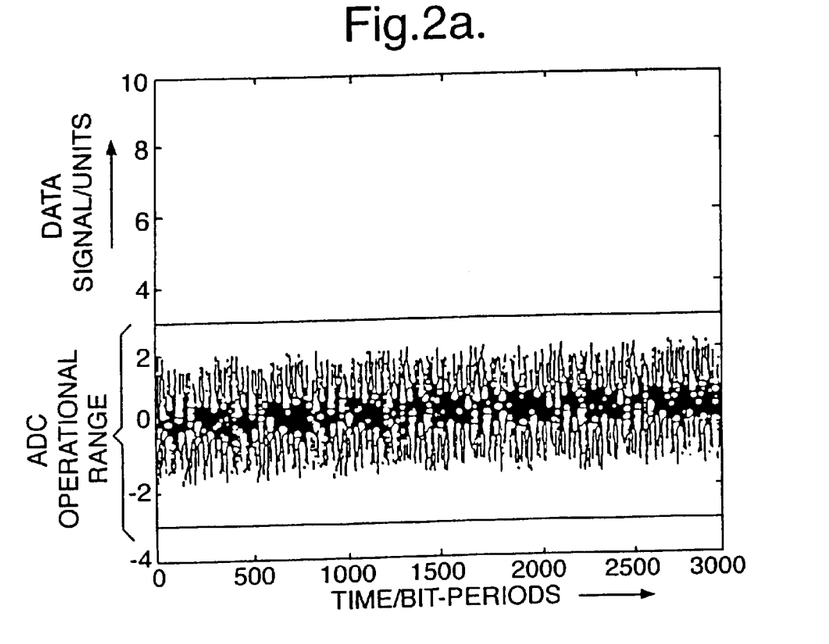
FIG. 2a illustrates a typical data signal.

Data storage units for computers consist of media on which data can be written, stored and read at a required time. Data is usually stored as magnetization patterns on the media, and these patterns are detected during a read process by a magneto-resistive (MR) head which produces a data signal A magneto-resistive (MR) head undergoes a change in resistance in the presence of a changing magnetic field, and this resistance change is transformed into an output voltage signal (data signal) by passing a constant current through the MR head. An example of such a data signal is illustrated in FIG. 2a, which plots the magnitude of the data signal (measured in unspecified units) against time (measured in bit periods). MR heads are now becoming increasingly popular in magnetic data storage products such as the hard disk drive (HDD), due to the high signal to noise (SNR) and the robustness to tracking errors they provide. The output voltage signal from the MR head is amplified, and converted from an analogue signal to a digital signal. In products that use a partial-response-maximum-likelihood (PRML) channel the output voltage signal is passed through the PRML read channel to estimate the data that was recorded on the media. In a PRML read channel partial response (PR) signalling is used in combination with maximum-likelihood sequence detection (MLSD). The frequency response of the read channel is designed to have frequency nulls at dc and at the Nyquist frequency (half the data sampling frequency). This partial response format is achieved by the combination of an analogue filter, a variable gain amplifier (VGA), a sampling device and possibly a discrete-time filter. Maximum-likelihood sequence detection is achieved using a Viterbi detector. Further details of the application of a PRML system to digital magnetic recording may be found in "A PRML System for Digital Magnetic Recording", IEEE Journal on Selected Areas in Communications, Vol 10, No 1, Jan. 1992, by Cideciyan et al.

Figure 1:
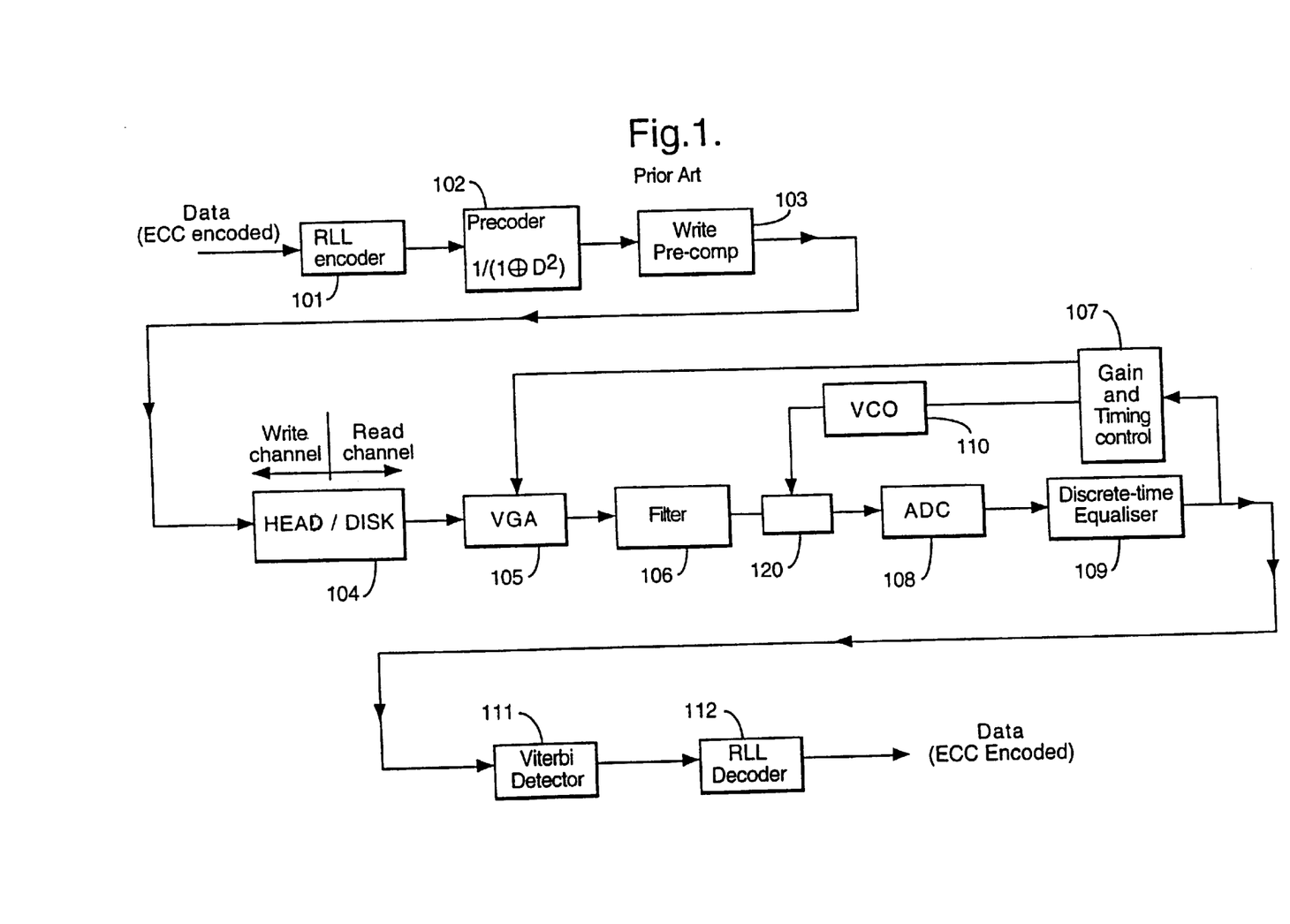
FIG. 1 is a schematic representation of a PRML data channel according to the prior art.

FIG. 1 illustrates as a block diagram, a typical PRML write and read channel. A PRML channel refers to the circuitry that writes error control encoded data on to the media in the disk drive as magnetization patterns (write channel) and recovers the data stored on the medium, from the output voltage signals of the MR head in the head/disk block 104 (read channel).

For the write process, the error control encoded (ECC) data is passed to an encoder 101 for run-length limited (RLL) coding. The output of the encoder 101 is passed to a precoder 102 which is described by a $1/(1 \oplus D^2)$ operation, where D is the delay operator. The resulting bit pattern, output by the precoder 102, is passed to the write pre-compensation circuit 103 which produces the final pulse signal to be applied to a write circuit incorporated in the head/disk block 104. The write circuit provides a write current to produce the magnetization pattern on the media.

During the read out process, the signal from the MR head incorporated in the head/disk block 104, is passed to a variable gain amplifier (VGA) 105. The gain of the VGA 105 is controlled by a gain and timing control loop 107. Slow variations in the data signal amplitude are compensated by the gain control loop 107. The signal output from the VGA 105 is passed to a low-pass filter 106. The output of low-pass filter 106 is input to the bit rate sampler 120. The bit rate sampler 120 is connected to a voltage controlled oscillator (VCO) 110 which controls the sampling times of the bit rate sampler 120. The VCO 110 is connected to and controlled by the gain and timing control loop 107. The output of the bit rate sampler 120 is connected to an analogue to digital converter (ADC) 108.The operational range of the ADC 108 (illustrated in FIG. 2a) is not much larger than the nominal range of the data signal output from the low-pass filter 106 as can be seen from FIG. 2a. The digitized samples, output from the ADC 108, are applied to a discrete-time equalizer 109, which is usually a finite impulse response (FIR) digital filter. The equalized samples, output from the discrete-time equalizer 109 is supplied as an input to the gain and timing control loop 107 and to the Viterbi detector 111. The output of the Viterbi detector 111 is connected to a decoder 112 which run length decodes the output of the Viterbi detector to produce the error control encoded data originally supplied, during the write process, to the encoder 101 in the write channel.

Figure 2B:
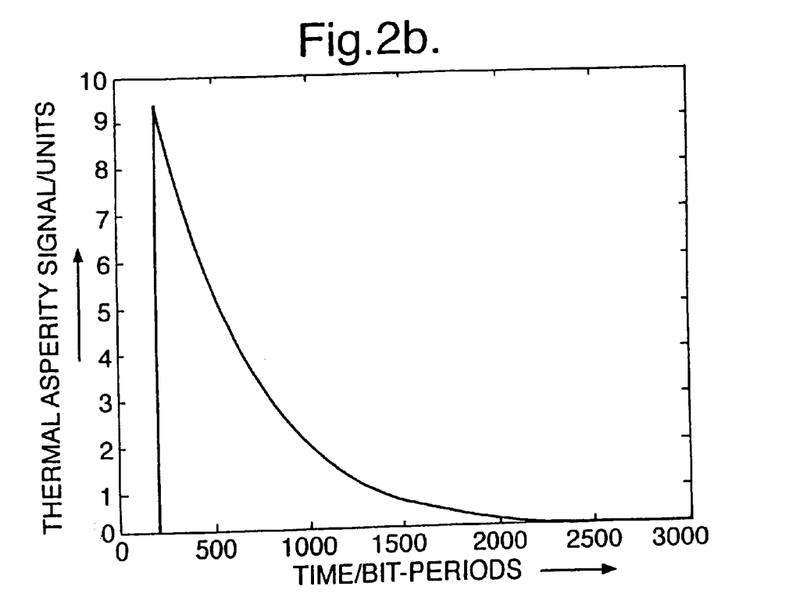
FIG. 2b illustrates a typical thermal asperity signa.
Figure 2C:
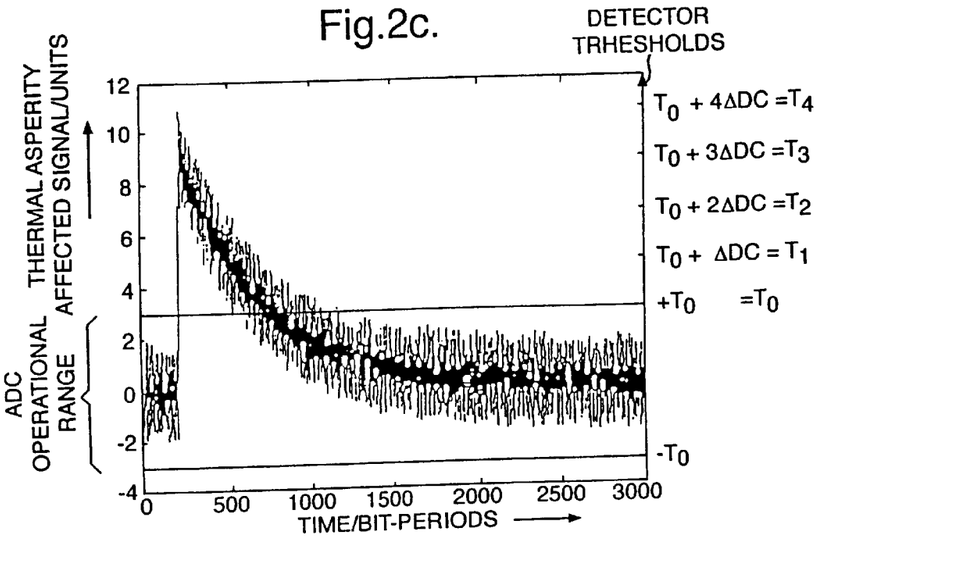
FIG. 2c illustrates a typical TA-affected signal.

The introduction of MR heads, along with the PRML read channel has been responsible for large improvements in magnetic data storage. However asperities or defects on the storage media, give rise to thermal effects in the MR head which tends to decrease the reliability of the MR head. These asperities or defects are referred to as thermal asperities. When an MR head hits a defect (asperity) on the disk, the friction between the MR head and the defect causes the temperature to rise sharply. This increases the resistance of the MR head element substantially, causing a voltage increase at the MR head output lasting for tens of nano-seconds. As the MR head element cools down to the temperature of the environment, the thermal asperity signal returns slowly to zero. The amplitude of the TA signal can be as high as 250% of the peak-to-peak data signal, and the time taken for the TA to decay to 30% of its maximum can be of the order of a few micro-seconds. This additive disturbance in voltage is called the thermal asperity (TA) signal. The MR head output saturates the ADC 108 used to convert the analogue output voltage signal to a digital signal. Thus at high data rates of the order of 100 MHz, the MR head output signal can exceed the operational range of the ADC 108 for a period spanning a few hundred bit periods causing long error bursts that the error correction techniques used cannot handle. The rise time of the TA signal is only of the order of a few bit periods. An example of a TA signal is illustrated in FIG. 2b. In this Figure the magnitude of a TA signal (measured in unspecified units) is plotted against time (measured in bit periods). The MR head output is then a thermal asperity affected signal consisting of the additive combination of the data signal (FIG. 2a) and a thermal asperity signal (FIG. 2b). An example of a thermal asperity (TA) affected signal is illustrated in FIG. 2c. In this Figure the magnitude of the TA-affected signal (measured in unspecified units) is plotted against time (measured in bit periods).

One way of reducing the effects of thermal asperity is to design heads that have reduced TA sensitivity. Two such heads are the flux guide head and the dual stripe head. The former lowers head sensitivity and the latter adds cost and complexity to the head.

Electronic compensation methods to take into account the TA error have been proposed. One class of prior arrangements (U.S. Pat. No. 4,914,398 and U.S. Pat. No. 5,057,785) for electronic TA abatement reconstructs the TA signal through envelope detection of the TA-affected signal and the subtraction of the envelope from the TA-affected signal, thereby restoring an approximation of the data signal. The method suffers from the disadvantage that the reconstruction circuitry adds to the complexity and introduces some delay. More importantly, the reconstruction is never perfect, and some data ripple and noise filter through, causing channel degradation. This degradation may not be noticeable in specific runs, however they can cause random errors during the millions of times the TA-affected sector is read during the lifetime of the disk.

Another prior arrangement for electronic TA abatement specifically relates to a PRML channel (U.S. Pat. No. 5,233,482). The Viterbi detector used in the PRML channel is robust to slow signal variations, and the TA signal is a slowly varying signal during the falling portion. Thus the errors due to TA in the PRML channel are due mainly to the short rising portion of the TA, the long saturation period of the ADC, and the possible failure of the gain and timing loops. In the method of U.S. Pat. No. 5,233,482, the presence of the TA signal is detected based on a count of samples that saturate the ADC. Once the presence of the TA signal is detected, the circuitry is put in TA mode. The whole section is read again in the TA mode, with the ADC range doubled. There may also be a provision to increment the AC-pole while re-reading the TA-affected sector. In addition, the timing and ADC loops are frozen at the onset of the TA mode for a fixed length of the sector. The principle of this method is that with the expanded ADC range and AC-pole incremented, more of the TA-affected signal is captured within the ADC range, and the length of saturated bits is largely reduced, thereby reducing the TA errors significantly. While simple to implement, this method still has some disadvantages. Since the number of bits in the ADC is not increased, expansion of the ADC range results in a loss in SNR due to the loss in quantization resolution. Further, if the TA signal amplitude is large, even after ADC range expansion, a large saturation period remains, causing many errors. This is especially true if the fall time of the TA signal is large.

According to a first aspect of the present invention there is provided a method of compensating for an additive signal in a data signal comprising the steps of:

detecting a contribution to said data signal by said additive signal;

initially compensating the data signal by maintaining a DC offset in said data signal, the initial level of said DC offset being set in dependence on said detected contribution; and while compensating the data signal, detecting when said compensated data signal exceeds a predetermined threshold and varying the set level of said DC offset in dependence upon said detection.

According to a preferred embodiment this method is used to compensate for an additive disturbance in a partial-response maximum-likelihood data detection channel which includes converting the compensated data signal from analogue to digital using an analogue to digital converter.

According to a further embodiment, such an analogue to digital converter has a fixed operational range.

According to a further aspect of the present invention there is provided a method of thermal asperity compensation using an analogue to digital converter, the method comprising the steps of:

detecting a thermal asperity signal and its polarity, and estimating its amplitude;

establishing a thermal asperity mode to respond to the detected thermal asperity;

initiating cancelling of a constant DC level from the signal input to the analogue to digital converter to produce a resultant signal, the magnitude of the DC level being determined by the thermal asperity amplitude estimate;

detecting the times during the thermal asperity mode at which the resultant signal exceeds the operational range of the analogue to digital converter in a polarity opposite to that of the estimated amplitude of the thermal asperity signal and then, cancelling the DC level in steps back to zero;

stopping the thermal asperity mode when the DC level is reduced back to zero.

According to a further aspect of the present invention there is provided circuitry for compensating for an additive signal in a data signal, comprising:

an input for receiving said data signal;

a summer for combining the data signal and a compensation signal to produce an output signal;

an output for outputting said output signal; and compensation means for receiving said output signal and providing said compensation signal, said compensation means being adapted to detect a contribution to said output signal by said additive signal, to set said compensation signal to an initial DC offset to compensate the output signal, the initial level of said DC offset being set in dependence on said detected contribution, and while compensating the output signal, to detect when said compensated output signal exceeds a predetermined threshold and to vary the set level of said DC offset in dependence upon said detection.

For a better understanding of the present invention and to understand how the same may be brought into effect, reference will now be made by way of example, to the enclosed Figures wherein:

BRIEF DESCRIPTION OF DRAWINGS

FIG. 6b is a schematic representation of the Viterbi detector of the circuit of FIG. 3, illustrating the correction of the difference metric as part of the TA compensation The circuit of FIG. 3 relates to an embodiment of the present invention. The Figure illustrates a PRML write and read channel similar to that illustrated in FIG. 1 and like numerals denote like features. The circuit of FIG. 3 additionally has a summer 130 placed between the output of the low pass filter 106 and the input to the bit rate sampler 120 and a compensator 113. The compensator 113 receives the output of the bit-rate sampler 120 and produces compensation signal 115, detector control signal 117 and gain/timing control signal 116. The summer 130 receives the output from the low pass filter 106 and the compensation signal 115 and produces as an output, the input to the bit rate sampler 120. The detector control signal 117 and the control signal 116 produced by the compensator 113 are supplied respectively, to the Viterbi detector 111 and the gain and timing control loop 107. The output signal 114 of the filter 106 is the same as that described in relation to the circuit illustrated in FIG. 1, and will henceforth be referred to as the TA-affected signal. The TA-affected signal 114 is the additive combination of the data signal and a TA signal. The compensation signal 115 is subtracted from the TA-affected signal 114 by summer 130 to produce the compensated signal 118. The bit-rate sampler 120, under the control of the gain and timing control loop 107, samples the compensated signal 118 to produce the sampled signal 119 which is received as a input to the compensator 113 and the ADC 108. The ADC has normal operating range which does not vary. The digitized samples, output from the ADC 108, are applied to a discrete-time equalizer 109, which is usually an finite impulse response (FIR) digital filter. The equalized samples 121, output from the discrete-time equalizer 109 are supplied as an input to the gain and timing control loop 107 and to the Viterbi detector 111. The output of the Viterbi detector 111 is connected to a decoder 112 which run length decodes the output signal 410 of the Viterbi detector to produce the error control encoded data originally supplied during the write process to the encoder 101 in the write channel.

Figure 3:
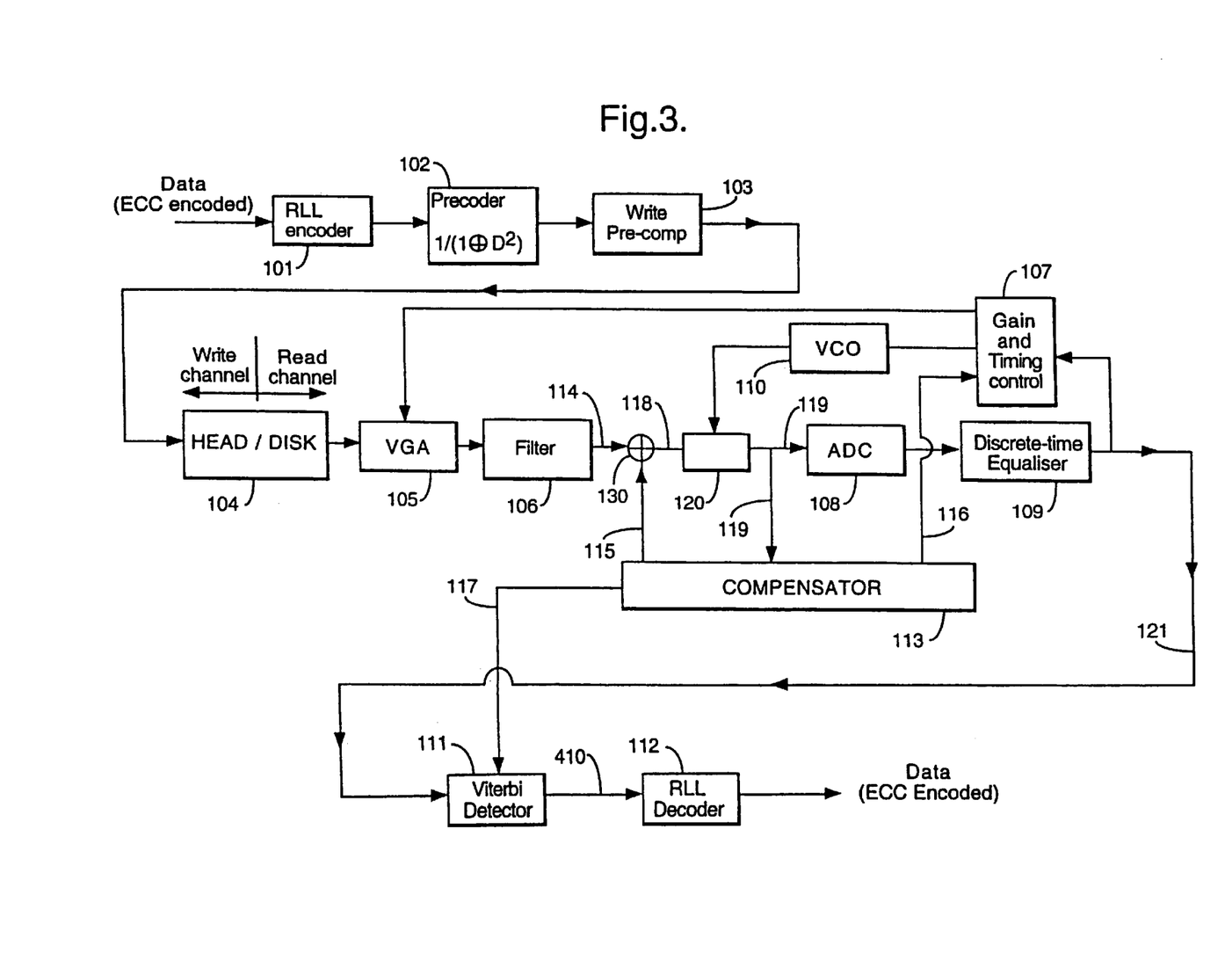
FIG. 3 is a schematic representation of a PRML data channel according to an embodiment of the invention.

In the absence of a thermal asperity, the circuit is in "normal mode". In the normal mode, the compensation signal is zero and the TA-affected signal reduces to the data signal (TA signal zero). In the normal mode the compensator 113 detects the presence of a TA signal (above a predetermined threshold) in the TA-affected signal 114 and initiates a thermal asperity mode. On initiating the TA mode the compensator 113 estimates the amplitude of the TA signal component in the TA-affected signal and presents an initial DC voltage level offset as a compensation signal 115. During the TA mode, the compensator 113 reduces the compensation signal 115 to a zero value in a step-wise fashion as the TA signal (and TA-affected signal 114) reduces. The compensated signal 118 is thus kept within the operational range of the ADC 108. During the TA mode the compensator 113 also holds the gain and timing control loop 107, using gain and timing control signal 116. As a Viterbi detector 111 is used in this particular embodiment, the compensator 113 provides a detector control signal 117 to the Viterbi detector 111 to compensate for the step-wise decrement in the compensation signal 115 and the corresponding increments in the compensated signal 118.

Figure 2D:
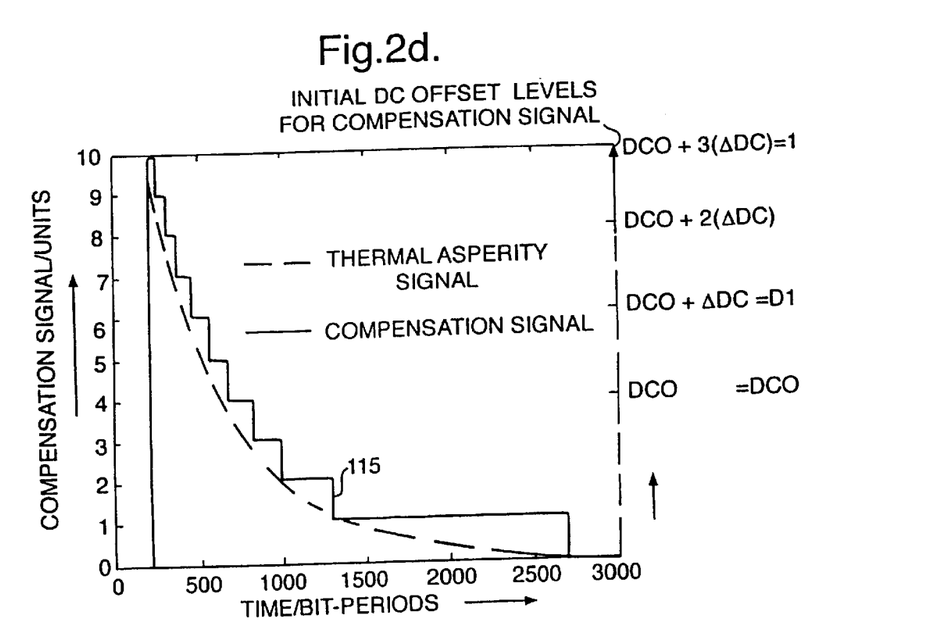
FIG. 2d illustrates a typical compensation signal.
Figure 2E:
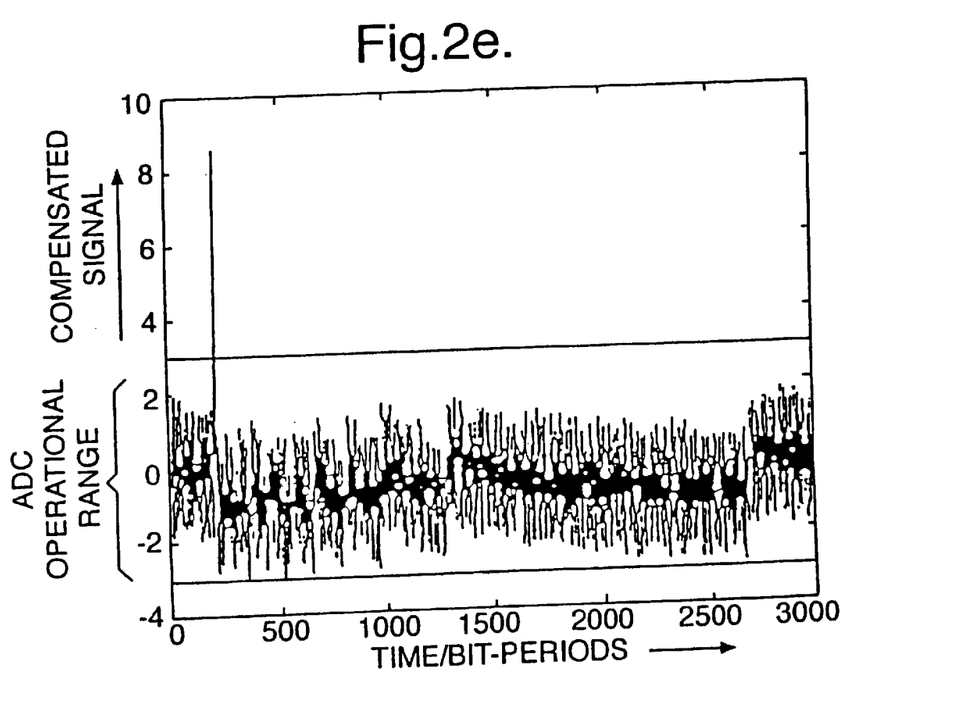
FIG. 2e illustrates a typical compensated TA-affected signal.

FIG. 2d illustrates a possible relationship between the TA signal (as previously illustrated in FIG. 2b) and the compensation signal 115. This Figure plots the magnitude of the TA signal and the compensation signal (measured in unspecified units) against time (measured in bit periods). FIG. 2e illustrates a compensated signal 119 formed from the difference of the TA-affected signal 114 illustrated in FIG. 2c and the compensation signal 115 illustrated in FIG. 2d by the summer 110. This Figure plots the magnitude of the compensated signal 118 (measured in unspecified units) against time (measured in bit periods).

Figure 4:
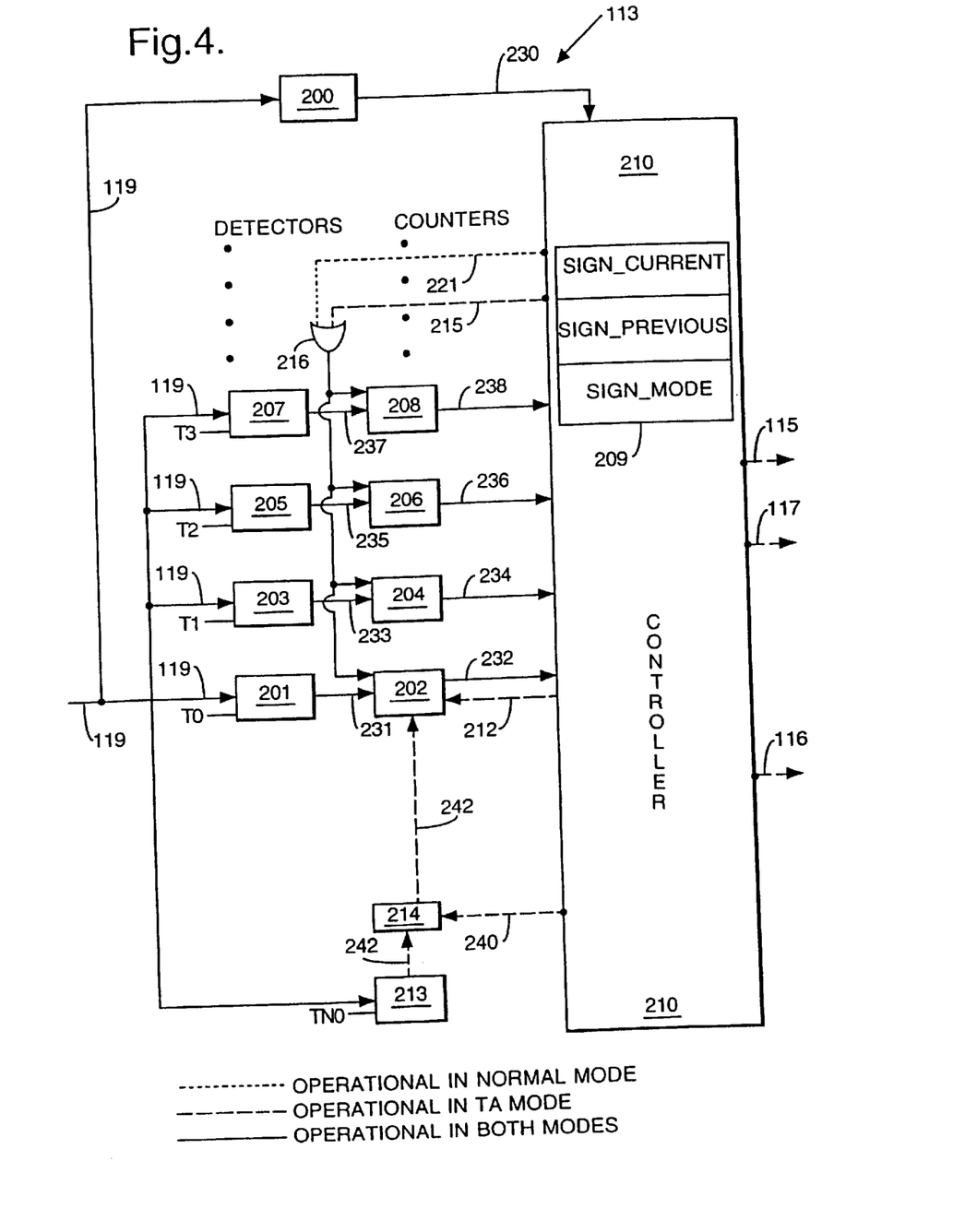
FIG. 4 illustrates the configuration of a compensator used in the circuit of FIG. 3.

We refer now to FIG. 4 which illustrates a compensator 113 suitable for use in the circuit of FIG. 3 in which the sampled signal 119 input to the ADC 108 is also fed to the compensator 113. The sampled signal on receipt by the compensator 113 is supplied to a polarity detector circuitry 200, to each of first, second, third and fourth and possibly more adjustable threshold detectors 201, 203, 205 and 207 and to the additional adjustable threshold detector 213.

The polarity detector circuitry 200 supplies a sign signal 230 to the controller 210 for each sampled signal 119 received. The sign signal 230 indicates the sign (plus/minus) of the sampled signal 119. The controller 210 has a register 209 in which the values of the sign signal 230 are stored. The sign signal for the current signal sample 119 is stored in register 209 as $SIGN_{13}$ CURRENT. The sign signal for the previous signal sample is stored in register 209 as $SIGN_{13}$ PREVIOUS. The updating of the register 209 occurs in the normal mode and the TA mode on the receipt of the sign signal 230. When the TA mode is initiated the value of the sign signal 230 is stored in register 209 as $SIGN_{13}$ CURRENT and as $SIGN_{13}$ MODE. The value of $SIGN_{13}$ MODE represents the sign of the TA signal when the TA mode was activated.

The sampled signal 119 is also supplied to each of the series of first, second, third and fourth adjustable threshold detectors 201, 203, 205 and 207. The first, second, third and fourth threshold detectors 201, 203, 205 and 207 each receive the sampled signal 119 and respective first, second, third and fourth threshold values T0, T1, T2 and T3, as inputs. The threshold values, in this embodiment, are set at $T1=T0+\Delta DC$, $T2=T0+2(\Delta DC)$, $T3=T0+3(\Delta DC)$, where $\Delta DC$ is a pre-set incremental DC-step. The first, second, third and fourth threshold detectors 201, 203, 205 and 207 respectively produce first, second, third and fourth detection signals 231, 233, 235 and 237. The detection signals are pulsed signals and a pulse is produced each time the magnitude (irrespective of sign) of the sampled signal 119 exceeds the threshold detector's threshold value. The first, second, third and fourth threshold detectors 201, 203, 205 and 207 operate in the same manner in both the normal mode and the TA mode. First, second, third and fourth counters 202, 204, 206 and 208 receive respectively the first, second, third and fourth detection signals 231, 233, 235 and 237 and produce respective first, second, third and fourth count signals 232, 234, 236 and 238. The first, second, third and fourth count signals 232, 234, 236 and 238 are supplied to the controller 210. Each count signal produced by a counter represents the number of pulsed detection signals received at that counter since it was last reset.

The first, second, third and fourth counters 202, 204, 206 and 208 may be reset during the normal mode by reset signal (normal) 221 supplied by the controller 210 via OR gate 216 to each of the first, second, third and fourth counters. The controller 210 produces reset signal (normal) 221 when in the normal mode, $SIGN_{13}$ CURRENT does not equal $SIGN_{13}$ PREVIOUS. Otherwise the reset signal (normal) 221 cannot be produced. The first, second, third and fourth counters 202, 204, 206 and 208 may be reset during the TA mode by reset signal 215 supplied by the controller 210 via OR gate 216 to each of the first, second, third and fourth counters. The controller 210 produces reset signal 215 when the TA mode is initiated (step 514 in FIG. 5), when the controller decrements the compensation signal 115 in the TA mode (step 555 in FIG. 5), and when the controller deactivates the TA mode (step 556 in FIG. 5).

The first counter 202 may be reset during the TA mode by the reset signal (TA) 242. The sampled signal 119 is also supplied to the additional threshold detector 213 which is used to reset the counter 202 during the TA mode. The additional threshold detector 213 receives the sampled signal 119 and the threshold value TN0 and it produces a reset signal (TA) 242 when the sampled signal 119 exceeds the threshold value TN0. The reset signal (TA) is supplied to the first counter 202 via a gate 214. The gate 214 is controlled by the enable signal 240 supplied by controller 210. The controller controls the gate 214 so that it passes the reset signal (TA) 242 to the first counter 202 during the TA mode (and not in normal mode) and only when the polarity of the current signal sample 119 is the same as that of the TA. Otherwise the controller blocks the passage of the reset signal (TA) 242 to the first counter.

The counter 202 also receives control signal 212 from the controller 210. This signal causes the counter 202 to operate differently in the TA mode compared to the normal mode. In the normal mode the counter 202 is permanently enabled via control signal 212. In the TA mode, the counter 202 is enabled by control signal 212 only if the value of $SIGN_{13}$ CURRENT in register 209 is different to that of $SIGN_{13}$ MODE in register 209. Consequently, the counter 202 is enabled during the TA mode only if the sampled signal 119 is of opposite polarity to the TA signal.

Figure 5A:
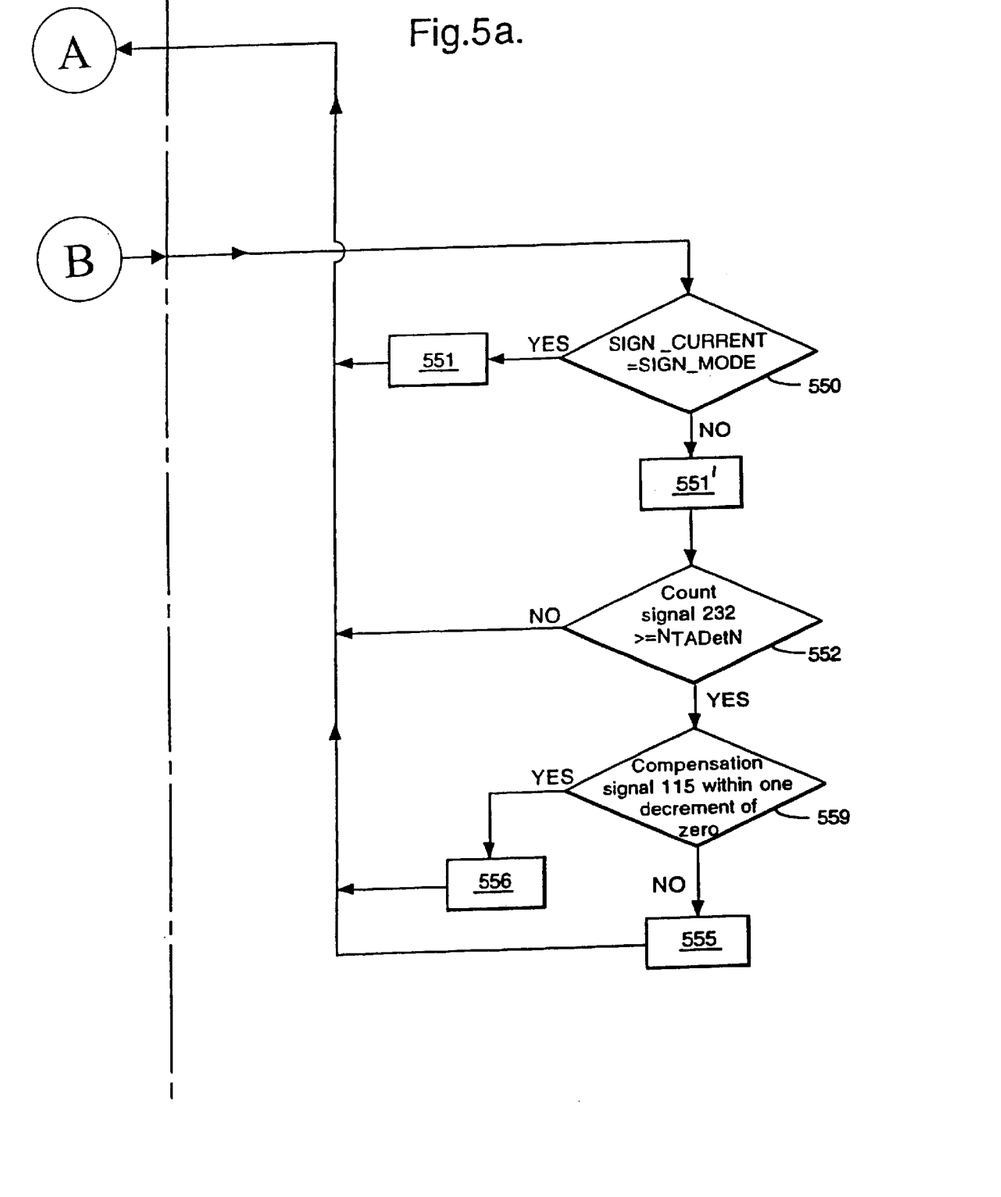
FIGS. 5A and 5B illustrate the decision logic of the controller of the compensator of FIG. 4.
Figure 5B:
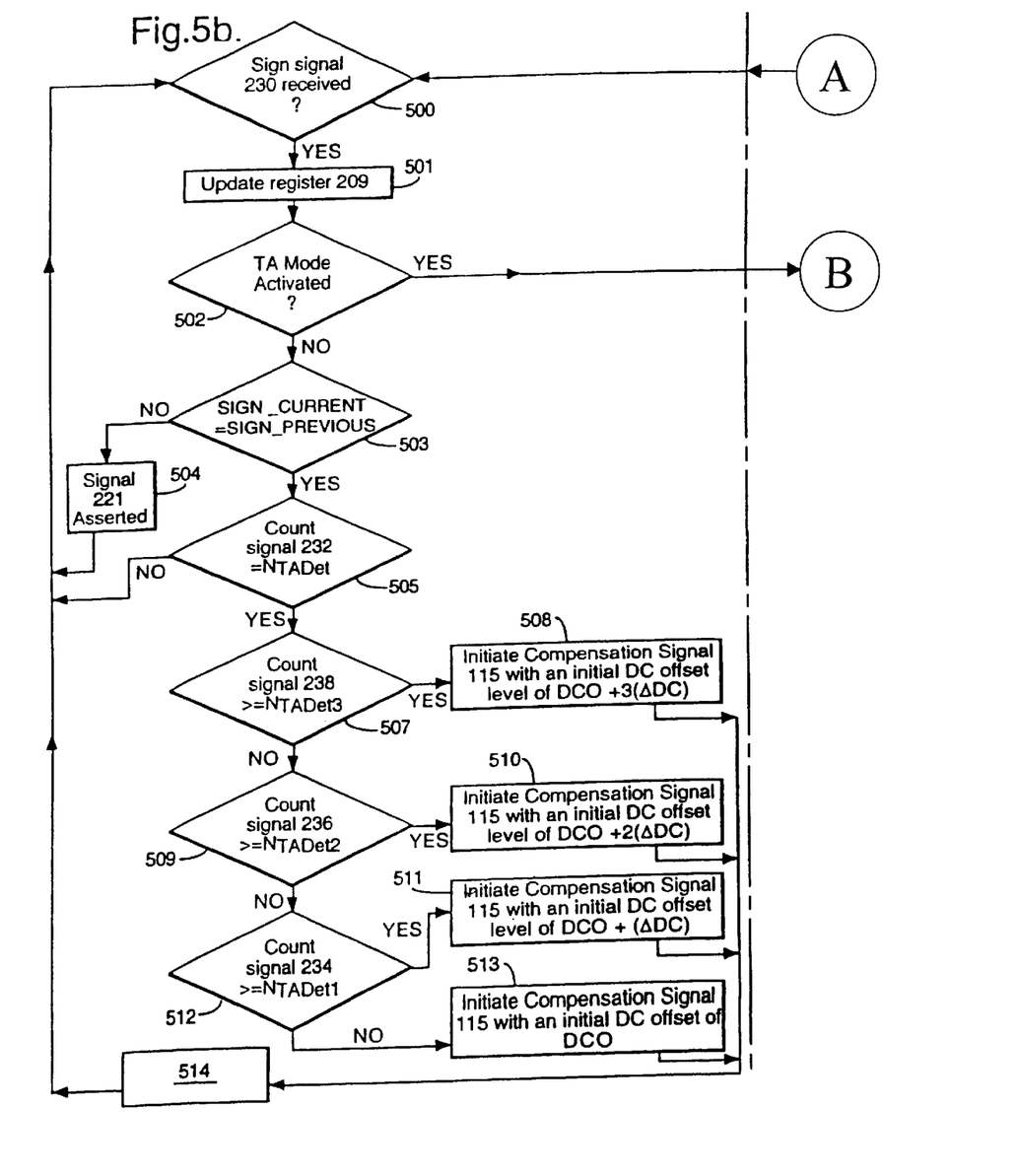

The controller on the basis of the first, second, third and fourth count signals 232, 234, 236 and 238 and the register values $SIGN_{13}$ CURRENT and $SIGN_{13}$ PREVIOUS, determines if a thermal asperity has occurred, estimates the TA signal and initiates the TA mode as discussed further below in relation to FIG. 5. The controller produces as outputs, in the TA mode, a compensation signal 115, a detector control signal 117 and timing and gain control signal 116.

A thermal asperity often causes a quick shift in the TA-affected signal 114 which would saturate the ADC 108. This is used to detect and estimate the amplitude of the TA signal and hence the initial DC offset value of the compensation signal 115. The controller receives as inputs the sign signal 230 and the first, second, third, and fourth count signals 232, 234, 236 and 238. The operation of the controller 210 of FIG. 4 will be explained with reference to FIG. 5 which illustrates the functionality of the controller 210. The controller 210 receives the sign signal 230 from the polarity detector circuitry 200 each time the compensator 113 receives a sampled signal 119 (step 500 in FIG. 5). The controller then updates the register 209. It writes the value of $SIGN_{13}$ CURRENT into $SIGN_{13}$ PREVIOUS and writes the value of the received sign signal 230 into $SIGN_{13}$ CURRENT (step 501 in FIG. 5) The controller then determines whether the operational mode is the normal mode or the TA mode (step 502 in FIG. 5). If the normal mode is operational the controller jumps to step 503. If the TA mode is activated the controller jumps to step 550

NORMAL MODE

At step 503 the controller checks whether $SIGN_{13}$ CURRENT is equal to $SIGN_{13}$ PREVIOUS. If there is not equality the controller asserts the reset signal (normal) 221 to reset the first, second, third and fourth counters 202,204, 206 and 208 (step 504) and then jumps to step 500 to await the arrival of another sign signal 500. If the sign of the current ($SIGN_{13}$ CURRENT) and the previous ($SIGN_{13}$ PREVIOUS) sampled signals 119 are different, it means that the current sample has changed in polarity from the last one, and the counter 202 is reset by signal 221. This is done to ensure that the count does not accumulate due to incidents different from TA-affected signal shifts, which may perhaps be due to noise or gain variations. If there is equality the controller moves to step 505 to determine whether the normal mode should be terminated and the TA mode initiated.

At step 505 the controller compares the value of the first count signal 232 to a first qualifying value $N_{TADet}$. If the value of the first count signal 232 has not yet become equal to the first qualifying value $N_{TADet}$ then the controller does not change its operational mode, and it jumps to step 500 to await the reception of a sign signal 230. If the first count signal has become equal to the first qualifying value $N_{TADet}$ then the controller moves to step 507. The controller will subsequently initiate the TA mode and set the initial DC offset level of the compensation signal 115.

At step 507 the controller compares the value of the fourth count signal 238 to a fourth qualifying value $N_{TADet3}$. The fourth count signal is the count signal from the counter attached to the threshold detector having the largest threshold value. If the value of the fourth count signal is greater than or equal to the value of the fourth qualifying value then the controller moves to step 508 and sets the compensation signal 115 at an initial DC offset level of $DC3=DC0+3$ ($\Delta DC$), where DC0 is the minimum DC offset level and $\Delta DC$ is a pre-set incremental step previously defined in relation to the threshold voltage values T0, T1, T2 and T3. After step 508 the controller jumps to step 514. If the value of the fourth count signal is less than the value of the fourth qualifying value then the controller moves to step 509.

At step 509 the controller compares the value of the third count signal 236 to a third qualifying value $N_{TADet2}$. If the value of the third count signal is greater than or equal to the value of the third qualifying value then the controller moves to step 510 and sets the compensation signal 115 at an initial DC offset level of $DC2=DC0+2(\Delta DC)$ After step 510 the controller jumps to step 514. If the value of the third count signal 236 is less than the value of the third qualifying value then the controller moves to step 512.

At step 512 the controller compares the value of the second count signal 234 to a second qualifying value $N_{TADet1}$. If the value of the second count signal is greater than or equal to the value of the second qualifying value then the controller moves to step 511 and sets the compensation signal 115 at an initial DC offset level of $DC1=DC0+(\Delta DC)$. After step 511 the controller jumps to step 514. If the value of the second count signal 234 is less than the value of the second qualifying value then the controller moves to step 513.

At step 513 the controller sets the compensation signal 115 at an initial DC offset level of DC0 and moves to step 514.

At step 514 the controller performs the following functions: the controller asserts and maintains the timing and gain control signal 116 and further changes to the VGA gain and sampling phase are disabled. The controller activates and maintains the TA mode until it is positively deactivated in step 556 of FIG. 5. The controller asserts reset signal 215 and resets the first, second, third and fourth counters 202, 204, 206 and 208. The reset signal (normal) 221 is disabled in the TA mode. The controller asserts and maintains enable signal 240 which enables gate 214 to pass the reset signal (TA) 242 to the first counter 202. The controller moves the contents of $SIGN_{13}$ CURRENT in register 209 into $SIGN_{13}$ MODE. The controller then jumps to step 500 to await the reception of a sign signal 230.

The steps 507 to 513 ensure that the initial DC offset level of compensation signal 115 is determined by the detector with the highest threshold value for which the count in the corresponding counter has reached its qualifying value. For example, if only the count of the first counter 202 reaches its first qualifying value of $N_{TADet}$, and the other counters have not reached their qualifying values then the initial DC offset of the compensation signal 115 is set at DC0 whereas if the count of the fourth counter 208 reaches the fourth qualifying value $N_{TADet3}$, and the counts of the higher counters (if present) have not reached their qualifying values, the initial DC offset level of the compensation signal 115 would be DC3=DC0+3($\Delta$DC).

THERMAL ASPERITY MODE

After the TA signal has been detected, its amplitude estimated and the initial DC offset level of the compensation signal 115 enabled, the compensated signal 118 falls within the ADC range, provided the DC levels have been chosen properly and the TA signal amplitude is not higher than the highest DC level. As the TA signal drops, the TA-affected signal also drops and the compensation signal 115 remains constant, so that after a while, the compensated signal overshoots the ADC range in a polarity opposite to that of the TA signal. At this point, some samples start saturating the ADC 108 on the opposite polarity as the TA signal. This fact is used to release the DC levels of the compensation signal 115 in discrete steps back to zero, as the TA signal drops to zero. The compensation signal 115 is adjusted when the count of the first counter 202 reaches a qualifying value $N_{TADetN}$ during the TA mode. The DC level of the compensation signal 115 is released by a step of one unit and the first counter 202 is reset by the signal 215. This process continues until the cancelling DC level has been reduced to zero. Once the cancelling DC level is reduced to 0, the TA mode is stopped, the counters reset by the signal 215 and the gain and timing control loops re-enabled.

Referring again to FIG. 5, the operation of the controller 210 in the TA mode will be explained in more detail. As previously mentioned the controller receives the sign signal 230 each time the compensator 113 receives a sampled signal 119 (step 500). The controller then updates the register 209 (step 501) and determines whether the operational mode is the normal mode or the TA mode (step 502). If the normal mode is operational the controller jumps to step 503. If the TA mode is activated the controller jumps to step 550.

At step 550 the controller checks whether SIGN$_{13}$ CURRENT is equal to SIGN$_{13}$ MODE. If there is equality the controller moves to step 551 and disables the first counter 202 via control signal 212 and then jumps to step 500 to await the reception of another sign signal 230. If there is not equality the controller moves to step 551' and asserts the control signal 212 which enables the first counter 202 and then moves to step 552 to determine whether the value of the compensation signal 115 should be adjusted.

At step 552 the controller determines whether the value of the compensation signal 115 should be adjusted. The controller compares the first count signal 232 to a qualifying value $N_{TADetN}$. If the value of the first count signal 232 is less than the value of the qualifying value $N_{TADetN}$ then the controller jumps to step 500 to await the reception of a sign signal 230. If the value of the first count signal 232 is greater than or equal to the qualifying value $N_{TADetN}$ then the controller moves to step 554.

At step 554 the controller determines whether the compensation signal 115, if decremented by the step 555, would be zero. If this is the case the controller moves to step 556. If this is not the case the controller moves to block 555.

At step 555, the controller decrements the compensation signal 115 by a predetermined value of one unit. The controller also asserts the detector control signal 117, the purpose of which will be described later and resets the first counter 202 by asserting the control signal 215. The controller then jumps to step 500 to await the reception of a sign signal 230.

At step 556, the controller deactivates the TA mode. The controller disables the timing and gain control signal 116 and thereby allows the gain and timing control loop 107 to function normally immediately or after a pre-determined settling time. The controller sets the compensation signal 115 to zero. The controller asserts the detector control signal 117. The controller disables the enable signal 240. The controller resets the first, second, third and fourth counters 202,204, 206 and 208 via reset signal 215. The controller then jumps to step 500 to await the reception of the next sign signal 230.

To ensure that only samples that genuinely overshoot the ADC operational range with polarity opposite to TA due to the diminution of the TA signal are counted, the counter 202 is reset during the TA mode by reset signal 242 if any sample is further in magnitude from T0 (with opposite polarity to TA) by the nominal peak-to-peak value of the signal. This may require an additional adjustable threshold detector 213 with a threshold TN0 (in practical implementation, one of the detectors 203, 205 etc may be used for this purpose). The reset operation is enabled only during the TA mode through the gate 214 by enabling signal 240.

A concrete example of the operation of the circuit of FIG. 3 will now be given and reference will be made to FIGS. 2a to 2e, wherein the x-axis of each figure is scaled according to the same units. The ADC 108 has an upper operational range of +3 units and a lower operational range of −3 units. The threshold values T0, T1, T2 and T3 of the first, second, third and fourth threshold detectors 201, 203, 205 and 207 are determined according to the previously given formula where T0 is 3 units and $\Delta$DC is 2 units. The values of the thresholds $T_0$, $T_1$, $T_2$ and $T_3$ of the first, second, third and fourth threshold detectors 201, 203, 205, 207 are illustrated on the plot of TA-affected signal v time in FIG. 2c. The controller 210 is configured so that DC0 is 4 units and the values for $N_{TADet}$, $N_{TADet1}$, $N_{TADet2}$, $N_{TADet3}$ and $N_{TADetN}$ are respectively 6, 2, 2, 2 and 2. The initial DC offset levels of the compensation signal 115 (DC0, DC1, DC2 and DC3) associated with the first, second, third and fourth counters 202, 204, 206 and 208, are illustrated on the plot of compensation signal vs time in FIG. 2d. The data signal (FIG. 2a) has a range between +2 units and −2 units. According to this example, the input to the compensator (the TA-affected signal in the normal mode) exceeds the threshold value T3 for a period exceeding $N_{TADet3}$ as illustrated in FIG. 2c. Consequently the controller via step 508 of FIG. 5 sets the initial DC offset level of the compensation signal 115 to DC3 as illustrated in FIG. 2d. As the magnitude of the TA signal (and the compensated TA-affected signal) reduces the controller reduces the compensation signal 115 in steps of one unit via step 555 of FIG. 5 as illustrated in FIG. 2d. The compensation signal will eventually be reduced to zero via step 556 of FIG. 5. The resultant compensated signal 118 is illustrated in FIG. 2e. In this example the threshold of the additional threshold detector 213, TN0 could be T0 (3 units) minus the nominal peak to peak value of the signal (4 units) i.e. 1 unit (in the polarity of TA).

The different DC levels to be used in the compensation signal 115 have to be determined by the TA statistics for instance, it is reasonable to assume that the TA amplitude varies from the 100% to 250% of the peak-to-peak read out signal.

The embodiment of the invention described in relation to FIGS. 3 and 4 uses first, second, third and fourth counters 202, 204, 206 and 208. It should be appreciated that any number of counters can be used with the resolution of the initial DC offset level increasing with the number used. It should also be appreciated that only the first counter of the first, second, third and fourth counters 202, 204, 206 and 208 is used in the TA mode. Consequently, one of the second, third or fourth threshold detectors 203, 205 and 207 associated with the second, third and fourth counters 204, 206 and 208 can be used to perform the function of the additional threshold detectors 213 in the TA mode.

When the compensation signal 115 is reduced by unity at each step of release (step 555 and step 556 of FIG. 5), it may cause some errors in the Viterbi detector 111 due to the quick change in the signal. However, this change is known, and can be compensated. At each step of DC level release, a detector control signal 117 is sent to the Viterbi detector 111 to enable an operation required to compensate for the signal change.

Figure 6A:
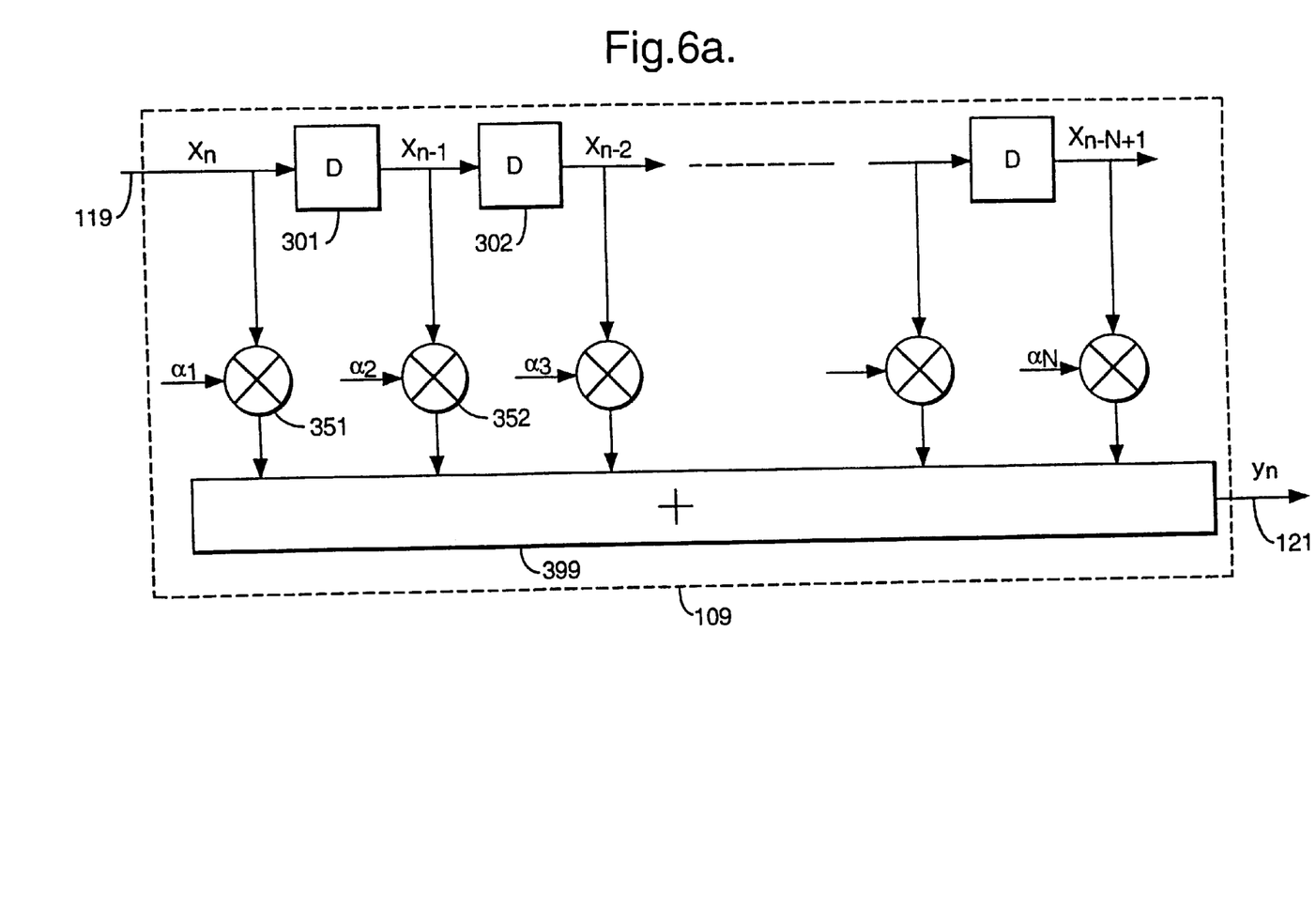
FIG. 6a is a schematic representation of the discrete-time equalizer of the circuit of FIG. 3.

FIG. 6a illustrates one possible implementation of the discrete time equalizer 109. The sampled digital signal 119, henceforth referred to as $x_n$, is supplied to the equalizer 109 which produces the equalized sample 121, henceforth referred to a $y_n$. "n" in relation to the sampled digital signal 119, and the equalized sample 121 indicates that the sample is the $n^{th}$ sample. In the particular implementation shown in FIG. 6a, the discrete time equalizer 109 is a simple finite-impulse response filter with N number of coefficients $\alpha_1$, $\alpha_2$, ... $\alpha_N$. The equalized sample $y_n$ is related to $x_n$ by the following equation:

$$y_n = \sum_{k=1}^{N} \alpha_k x_{n-k+1}$$

FIG. 6a shows the direct-form realization of the digital FIR filter, using delay elements 301, 302 etc. represented by D, corresponding multipliers 351, 352 etc., and a summer 399. In the direct-form realization of the FIR filter, the delayed samples of the digital signal 119 (i.e. $x_n$, $x_{n-1}$, $x_{n-2}$, ... etc.) are multiplied by the corresponding coefficients of the FIR filter (i.e. $\alpha_1$, $\alpha_2$, $\alpha_3$ ... etc.) and then summed to produce the output $y_n$. (For a description of different implementations of FIR filters, we refer to a standard text "Digital Signal Processing" by A. V. Oppenheim and R. W. Schafer, Prentice-Hall, Chapter 4).

Figure 6B:
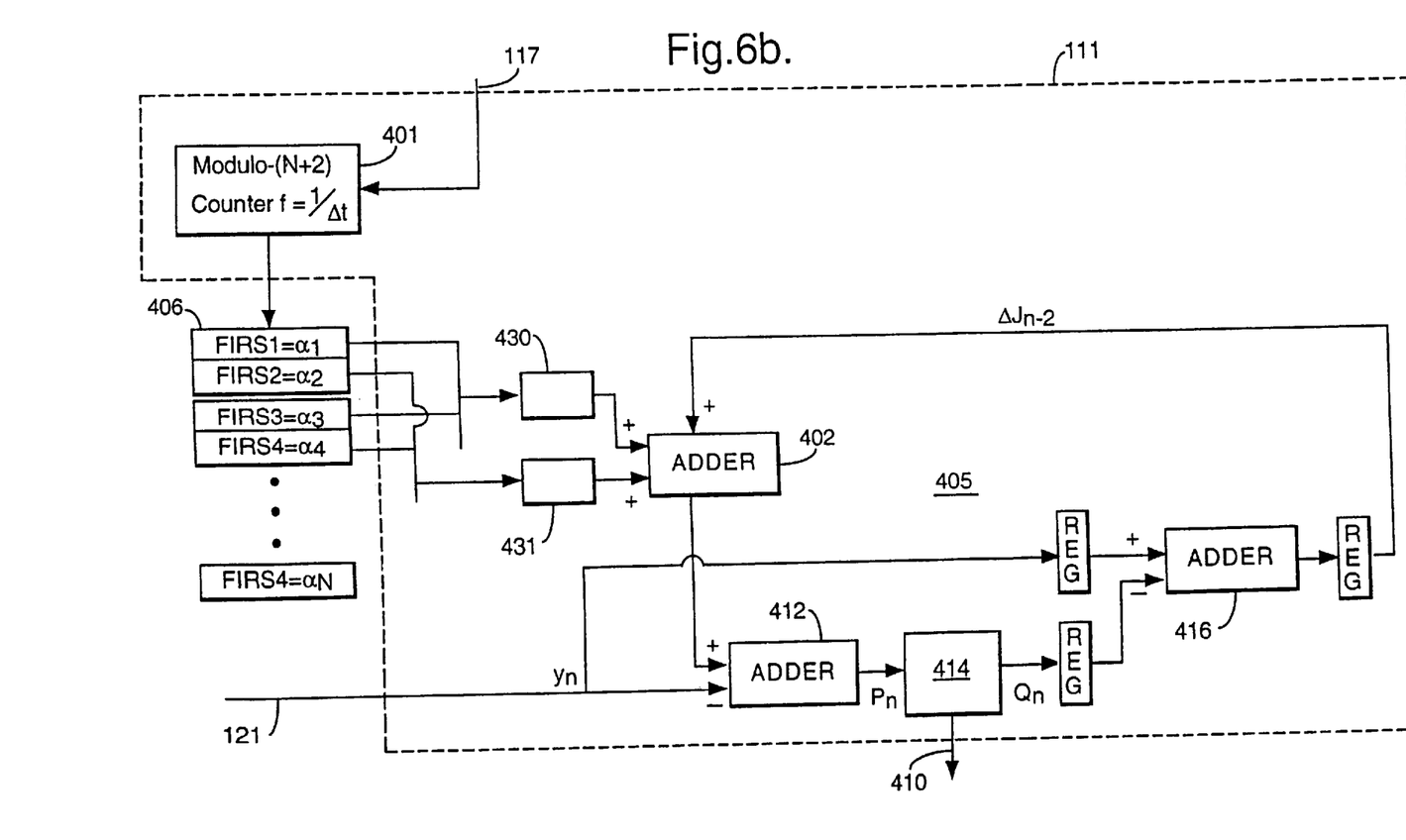

We now refer to Figure 6b, which illustrates the procedure for compensating the Viterbi detector at the times of DC level release during the TA mode. FIG. 6b shows one possible implementation for operating the Viterbi algorithm using difference metric computations for the PR4ML channel. The implementation of Viterbi decoding using difference metric computations is discussed in IEEE Journal on Selected Areas in Communications, Vol 10, No 1, Jan. 1992, "A PRML System for digital magnetic recording", by Cideciyan et al. The equalized samples 121 output from the FIR equalizer 109 is passed through the circuit 405 for difference metric computations. The circuit 405 implements the following algorithms for updating the difference metric:

$\Delta J_n = y_n + Q_n$, where $P_n = \Delta J_{n-2} - y_n$, and $Q_n = +1$ if $P_n \geq +1$ i.e. $\Delta J_n = y_n + 1$ $Q_n = P_n$ if $-1 < P_n < +1$ i.e. $\Delta J_n = \Delta J_{n-2}$ $Q_n = -1$ if $-1 \geq P_n$, i.e. $\Delta J_n = y_n - 1$ and where $\Delta J_n$ is the difference metric and $y_n$ is the nth equalized sample 121 to the Viterbi detector 111.

The Viterbi detector 111 receives equalized sample signal 121 and produces an output signal 410. The detector 111 combines the equalized sample signal 121 ($y_n$) with the difference metric $\Delta J_{n-2}$ in a summer 412 to produce $P_n$. Decision circuitry 414 receives $P_n$ and in dependence on its value produces $Q_n$ and the output signal 410. A summer 416 combines $y_n$ and $Q_n$ to produce $\Delta J_n$ which is fed back as an input to the summer 412, with a delay of two clock cycles implemented through two registers in series in the path of $\Delta J_n$. This arrangement automatically ensures that the Viterbi detection circuitry operates independently on the odd and even samples of the equalized signal 121, in an interleaved manner.

According to the described embodiment, the Viterbi detector 111 has an additional summer 402 as shown in FIG. 6b in the path of the difference metric $\Delta J_{n-2}$. The combination of the equalizer tap coefficients ($\alpha_1$, $\alpha_2$, ... $\alpha_N$), are the two other inputs to the summer 402, which are stored in the registers 430 and 431. When the controller 210 decrements the DC level of the compensation signal 115 by a step of unity, the sampled digital signal 119 $x_n$ undergoes an increment by a step of unity. This translates to a fast increase in the equalized signal sample 121 $y_n$, according to the equation given above relating $y_n$ and $x_n$. The equalized signal sample 121 $y_n$, increases by $\alpha_1, \alpha_2, \alpha_3 ... \alpha_N$ in consecutive channel clock cycles. To compensate for this, the controller 210 sends a control signal 117 to the Viterbi detector at the instant the DC level of the compensation signal 115 is decremented by a step of unity during the TA mode. This signal triggers a modulo (N+2) counter 401 operating at the rate 1/$\Delta t$ (the channel data rate), where N is the number of equalizer coefficients as defined before. A set 406 of registers FIRS1, FIRS2 ... etc store the FIR filter 109 weighting coefficients for the equalization ($\alpha_1, \alpha_2 ... \alpha_N$). As the count of counter 401 increases, the contents of the register in the set 406 of registers corresponding to the count is loaded into register 430 and 431 alternately, starting with register 430. At count 1, the content of register FIRS1, $\alpha_1$, is loaded into register 430. At count 2, the content of FIRS2, $\alpha_2$, is loaded into register 431. At count 3, the content of FIRS3, $\alpha_3$, is loaded into register 430 again, and so on. At counts N+1 and N+2, the contents of the registers 430 and 431 are successively reset to zero and maintained so until another control signal 117 is received. Two shift registers are used because the difference metric computation circuitry operates independently for the odd and even interleaved sequences of the equalizer output, the equalized samples 121. The summer 402 therefore compensates for the shift of one unit in $x_n$ (and corresponding shifts in the sequence $y_n$) by adjusting $\Delta J_n$ to compensate for the shift.

The Viterbi detector in the PRML channel is very robust to DC and slow variations in the signal, but sensitive to high frequency variations. At steps 555 and 556, when the compensation DC offset is decreased, the sudden rise in the signal $y_n$ can cause errors in the Viterbi detector. However, we can compensate for this since we know the sudden change in the signal $y_n$ when it happens. This change occurs before the FIR filter, and not directly to $y_n$. This is the reason the FIR weighting coefficients $\alpha_1, \alpha_2 ... \alpha_n$ have to be taken into account. In some PRML channel implementations, the discrete-time filter 109 is avoided, in which case the compensation procedure is simpler. In the presence of the FIR filter, the decrements are chosen to be 1 unit specifically to keep the compensation procedure simple. However if the decrements were chosen to be in non-1-unit amounts e.g. steps of $\beta$, the change in $y_n$ could be compensated by multiplying the tap outputs of the shift registers 430 and 431 by $\beta$.

FIG. 2c shows a TA-affected signal 114 output from the filter 106 for a portion of a sector, when a thermal asperity is present, with the time in bit-periods on the x-axis. The TA-affected signal 114 of FIG. 2c is the summation of the data signal and TA signal illustrated in FIGS. 2a and 2b respectively. The nominal range of the data signal is within ±2 units. Also shown in solid lines in FIGS. 2a, 2c and 2e are the references of the ADC 108 at ±3.0 units during normal operation. The amplitude of the TA signal (FIG. 2b) is about 250% of the nominal peak-to-peak signal and is about 9 units. Its rise time is 3 bit-periods, and the time taken to fall to 37% of the maximum is 500 bits (time-constant of the exponential fall). Note that with no compensation, a large number of samples of the TA-affected signal 114 (FIG. 2c) will saturate the ADC 108 and will become unrecoverable. FIG. 2d illustrates the compensation signal 115 variation and FIG. 2e shows the signal input to the ADC 108 (the compensated signal) when the compensation signal 115 illustrated in FIG. 2d is subtracted from the TA-affected signal illustrated in FIG. 2c. It is clear that the compensated signal falls within the ADC range almost at all times, and the saturation samples are confined to the initial periods of time it takes to initiate the compensator. In embodiments of the invention the operational range of the ADC 108 is not varied, it is fixed. With the compensation of the current embodiment of the present invention enabled, the number of errors given by the Viterbi detector 111 for this particular case is only 4. All these four errors are part of an error burst 9 bits long, and are confined to the period of TA detection and amplitude estimation. This error burst can be easily handled by the error correction encoding used.

What is claimed is:

1. A method of compensating for an additive signal in a data signal comprising the steps of:
    detecting a contribution to said data signal by said additive signal and estimating an amplitude of the detected contribution;
    initially compensating the data signal by maintaining a DC offset in said data signal, the initial level of said DC offset being set corresponding to the estimated amplitude of said detected contribution; and
    while compensating the data signal, detecting when said compensated data signal exceeds a predetermined threshold and varying the set level of said DC offset in dependence upon said detection.

2. A method of compensating for an additive disturbance in a partial-response maximum-likelihood data detection channel, comprising the steps of:
    compensating a data signal according to the method of claim 1;
    converting said compensated data signal from analogue to digital; and
    equalizing and detecting said digital signal using a digital filter and Viterbi detector to effect partial-response maximum-likelihood detection.

3. A method as claimed in claim 2, wherein the step of converting said compensated data signal from analogue to digital comprises sampling said analogue signal and converting said sampled signal using an analogue to digital converter having a fixed operational range.

4. A method as claimed in claim 3, further comprising the step of using a gain and timing control loop to control the input to the analogue to digital converter wherein during the compensation of the data signal, the operation of the timing and gain control loop is frozen.

5. A method as claimed in claim 2, further comprising, on varying the set level of the DC offset, controlling the detecting step in dependence on said variation.

6. A method as claimed in claim 2, wherein said digital filter is a finite impulse response filter having finite impulse response filter coefficients.

7. A method as claimed in claim 5, wherein said digital filter is a finite response filter having finite impulse response filter coefficients, wherein the step of controlling the detecting step in dependence on said variation comprises incrementing the difference metric used in the Viterbi detector computations in dependence upon the finite impulse response filter coefficients of the finite impulse response filter.

8. A method as claimed in claim 2, wherein the step of varying the set level of the DC offset includes effecting a stepwise variation in the set level of said DC offset.

9. A method as claimed in claim 2, wherein said step of detecting a contribution to said data signal comprises detecting when the level of said data signal has exceeded a predetermined detection threshold, for a predetermined duration.

10. A method as claimed in claim 9, wherein said initial level of said DC offset is dependent upon said exceeded predetermined detection threshold.

11. A method as claimed in claim 9, wherein said exceeded predetermined detection threshold is one of a plurality of predetermined detection thresholds.

12. A method as claimed in claim 2, wherein the step of varying the set level of the DC offset is dependent upon the compensated data signal exceeding said predetermined threshold for a predetermined duration.

13. A method as claimed in claim 1, wherein said step of compensating the data signal comprises adding or subtracting the level of said DC offset from the data signal.

14. A method as claimed in any claim 1, wherein said additive signal has a fast rise and slow decay, and said initial DC offset has an opposite polarity to a newly set level of the DC offset.

15. A method for correcting for the effects of thermal asperities on a storage device, comprising the method of claim 1, wherein said data signal is derived from said storage device and said additive signal is produced by said thermal asperities.

16. A method according to claim 1, wherein said data signal is processed by an analogue to digital converter, wherein the predetermined threshold is determined in accordance with the operational range of the analogue to digital converter wherein the compensated data signal is substantially maintained within the operational range of said analogue to digital converter.

17. A method of reading information stored on a storage device, comprising:
    reading the storage device to produce an analogue data signal;
    compensating said data signal according to the method of claim 1.

18. A method of reading information stored on a storage device as claimed in claim 17, wherein reading of the storage device comprises the reading of a magnetic medium with an MR head.

19. A method of thermal asperity compensation of a signal using an analogue to digital converter, the method comprising the steps of:
    detecting a thermal asperity signal and its polarity, and estimating an amplitude of the thermal asperity signal;
    establishing a thermal asperity mode to respond to the detected thermal asperity;
    initiating cancelling of a DC level from the signal input to the analogue to digital converter to produce a resultant signal, the magnitude of the DC level being set corresponding to the estimated amplitude of the thermal asperity signal;

detecting the times during the thermal asperity mode at which the resultant signal exceeds the operational range of the analogue to digital converter in a polarity opposite to that of the estimated amplitude of the thermal asperity signal and then, cancelling the DC level in steps back to zero;

stopping the thermal asperity mode when the DC level is reduced back to zero.

20. A method of thermal asperity compensation as claimed in claim 19, using a gain and timing control loop to control the input to the analogue to digital converter wherein during the thermal asperity mode the operations of the timing and gain control loop are frozen.

21. A method of thermal asperity compensation as claimed in claim 19 using a partial-response-maximum likelihood detection data channel having a finite impulse response filter and a Viterbi detector, the method further comprising the step of sending a signal to the Viterbi detector at each step of canceling the DC level to compensate for the change in the resultant signal.

22. A method as claimed in claim 21, wherein the step of compensating for the change in the resultant signal at the Viterbi detector comprises:

sending the signal to the Viterbi detector to activate a modulo (N+2) counter where N is the number of finite impulse response filter coefficients; and incrementing a difference metric used in the Viterbi detector computations by the finite impulse response filter coefficients for the following N+1 clock cycles.

23. Circuitry for compensating for an additive signal in a data signal, comprising:

an input for receiving said data signal;

a summer for combining the data signal and a compensation signal to produce an output signal;

an output for outputting said output signal; and compensation means for receiving said output signal and providing said compensation signal, said compensation means being adapted to detect a contribution to said output signal by said additive signal and estimate an amplitude of the detected contribution, to set said compensation signal to an initial DC offset to compensate the output signal, the initial level of said DC offset being set corresponding to the estimated amplitude of said detected contribution, and while compensating the output signal, to detect when said compensated output signal exceeds a predetermined threshold and to vary the set level of said DC offset in dependence upon said detection.

24. Circuitry as claimed in claim 23, further comprising:

a sampler and analogue to digital converter for converting said output signal to a digital signal, wherein said analogue to digital converter has a fixed operating range; and a digital filter and Viterbi detector for effecting partial response maximum-likelihood detection on said digital signal.

25. Circuitry as claimed in claim 24, further comprising a gain and timing control loop to control the output signal input to the analogue to digital converter, wherein during the compensation of the output signal, the operations of the timing and gain control loop are frozen.

26. Circuitry as claimed in claim 24, further comprising circuitry responsive to the variations in the set level of said DC offset to control the Viterbi detector.

27. Circuitry as claimed in claim 24, wherein said digital filter is a finite impulse response filter.

28. Circuitry as claimed in claim 26, wherein said Viterbi detector is responsive to variations in the set level of said DC offset to increment a difference metric used in the Viterbi detector computations in dependence upon the finite impulse response filter coefficients of the finite impulse response filter.

29. Circuitry as claimed in claim 23, wherein said compensation means is adapted to vary the set level of said DC offset in a stepwise manner.

30. Circuitry as claimed in claim 23, wherein said compensation means comprises threshold detection means having first threshold detection means for determining when said output signal exceeds a first predetermined threshold value.

31. Circuitry as claimed in claim 30, wherein said threshold detection means further comprises second threshold detection means for determining when said output signal exceeds a second predetermined threshold value.

32. Circuitry as claimed in claim 31, wherein said compensation means further comprises control means responsive to said first threshold detection means to set said compensation signal to an initial DC offset level and responsive to said second threshold detection means to vary said compensation signal.

33. Circuitry as claimed in claim 32, wherein said control means sets said compensation signal to an initial DC offset level dependent on said exceeded first predetermined threshold value.

34. Circuitry as claimed in claim 32, wherein said control means is responsive to said first threshold detection means to set said compensation signal when said output signal has exceeded said first predetermined threshold value for a predetermined duration.

35. Circuitry as claimed in claim 32, wherein said control means is responsive to said second threshold detection means to vary said compensation signal when said output signal has exceeded said second predetermined threshold value for a predetermined duration.

36. Circuitry as claimed in claim 30, wherein said first predetermined threshold value is one of a plurality of predetermined threshold values.

37. Circuitry as claimed in claim 31, wherein said first predetermined threshold value has an opposite polarity to said second predetermined threshold value.

38. Circuitry as claimed in claim 30, wherein said output signal is a sampled signal and said threshold detection means comprises at least one threshold detector and at least one counter.

39. Circuitry as claimed in claim 33, wherein said first threshold detection means comprises a plurality of threshold detectors each having an associated counter wherein each detector has one of a first plurality of predetermined threshold values and each counter counts the number of samples of the output signal exceeding the threshold value of its associated threshold detector.

40. Circuitry as claimed in claim 39, wherein said control means is responsive to said first threshold detection means to set said compensation signal when said output signal has exceeded said first predetermined threshold value for a predetermined duration, wherein said predetermined duration is determined when the counter associated with a threshold detector having the lowest of said first plurality of predetermined threshold values, exceeds a predetermined count.

41. Circuitry as claimed in claim 39, further comprising first reset means for resetting said plurality of counters.

42. Circuitry as claimed in claim 41, further comprising polarity detection means for detecting the polarity of said output signal, wherein said first reset means is enabled responsive to said polarity detection means.

43. Circuitry as claimed in claim 31, further comprising polarity detection means for detecting the polarity of said output signal, said second threshold detection means comprising a threshold detector having a second predetermined threshold value and an associated counter for counting the number of samples of the output signal which exceed the second predetermined threshold value, said second threshold detection means being enabled in response to said polarity detection means.

44. Circuitry as claimed in claim 43, further comprising second reset means for resetting said counter associated with the second predetermined threshold value.

45. Circuitry as claimed in claim 23, adapted for the compensation of a thermal asperity induced additive signal.

46. An apparatus for reading information from a storage medium comprising:

reading means for reading the storage medium and producing an analogue data signal;

gain control means for controlling the amplitude of said analogue data signal;

circuitry as claimed in claim 23;

an analogue to digital converter for converting the analogue output signal to a digital output signal; and equalization and detecting means for recovering said information from said digital output signal.

47. An apparatus for reading information from a storage medium comprising:

reading means for reading the storage medium and producing an analogue data signal;

gain control means for controlling the amplitude of said analogue data signal;

circuitry as claimed in claim 31;

an analogue to digital converter for converting the analogue output signal to a digital output signal; and equalization and detecting means for recovering said information from said digital output signal, wherein the second predetermined threshold value of the apparatus for compensating for an additive signal in the data signal, is determined by the operational range of the analogue to digital converter.

48. An apparatus as claimed in claim 46, wherein the compensation means provides a control signal to said detecting means on varying the compensation signal in a stepwise manner.

49. An apparatus as claimed in claim 46, wherein the compensation means provides a control signal to disable said gain control means on setting compensation signal to an initial DC offset level, said control signal being asserted until said compensation signal is reduced in a stepwise manner to zero.

* * * * *